US012544524B2

(12) United States Patent
Wada et al.

(10) Patent No.: US 12,544,524 B2
(45) Date of Patent: Feb. 10, 2026

(54) BLOWING DEVICE AND FLUID CONTROL DEVICE

(71) Applicant: Murata Manufacturing Co., Ltd., Kyoto (JP)

(72) Inventors: Hiroaki Wada, Kyoto (JP); Yuzo Higashiyama, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 1084 days.

(21) Appl. No.: 17/108,166

(22) Filed: Dec. 1, 2020

(65) Prior Publication Data

US 2021/0077760 A1 Mar. 18, 2021

Related U.S. Application Data

(63) Continuation of application No. PCT/JP2019/021978, filed on Jun. 3, 2019.

(30) Foreign Application Priority Data

Jun. 5, 2018 (JP) .................................. 2018-107776

(51) Int. Cl.
*A61M 16/00* (2006.01)
*A61M 16/06* (2006.01)
(Continued)

(52) U.S. Cl.
CPC ...... *A61M 16/0066* (2013.01); *A61M 16/024* (2017.08); *A61M 16/0666* (2013.01);
(Continued)

(58) Field of Classification Search
CPC .......... A61M 16/0066; A61M 16/0666; A61M 2205/103; A61M 2206/16; A61M 16/024;
(Continued)

(56) References Cited

U.S. PATENT DOCUMENTS 2,106,040 A * 1/1938 Schmidt .................. F04D 29/30
416/91
4,132,912 A * 1/1979 Wright .................... H02K 9/14
310/63
(Continued)

FOREIGN PATENT DOCUMENTS

EP 2 345 852 A1 7/2011
FR 2811156 A1 * 1/2002 ........... F04D 29/281
(Continued)

OTHER PUBLICATIONS

English translation for FR 2811156, machined translated by Espacenet.com, translated on Jan. 5, 2024.*

(Continued)

*Primary Examiner* — Tu A Vo
(74) *Attorney, Agent, or Firm* — McDonald Hopkins LLC

(57) ABSTRACT

A fan unit includes a fan case and a fan. The fan case has an intake port and a discharge port. The fan is provided inside the fan case and has a holding plate having a first surface and being rotatably supported; and a plurality of blade members provided upright on the first surface. The fan unit includes a first passage that is connected to the intake port and is defined by an inner surface of the fan case, the first surface of the holding plate, and two adjacent blades; and a second passage that is on a second surface side of the holding plate and is connected to the discharge port. An outer circumferential end section of the holding plate is positioned progressively lower towards the outside in the radial direction and has a skirt shape having a sharp gradient.

15 Claims, 14 Drawing Sheets

(51) Int. Cl.
    *F04D 29/28*     (2006.01)
    *A61M 16/08*     (2006.01)
    *A61M 16/10*     (2006.01)

(52) U.S. Cl.
    CPC ..... *F04D 29/28* (2013.01); *A61M 2016/0024* (2013.01); *A61M 16/0069* (2014.02); *A61M 16/0816* (2013.01); *A61M 16/107* (2014.02); *A61M 2205/103* (2013.01); *A61M 2205/3355* (2013.01); *A61M 2205/42* (2013.01); *A61M 2205/50* (2013.01); *A61M 2205/75* (2013.01); *A61M 2206/10* (2013.01); *A61M 2206/16* (2013.01)

(58) Field of Classification Search
    CPC ............ A61M 16/0816; A61M 16/107; A61M 2016/0024; A61M 2205/3355; A61M 2205/42; A61M 16/0069; A61M 2205/50; A61M 2205/75; A61M 2206/10; F04D 29/28
    See application file for complete search history.

(56) References Cited

U.S. PATENT DOCUMENTS

| | | | | |
|---|---|---|---|---|
| 4,759,272 | A * | 7/1988 | Zaniewski | F24F 7/06 |
| | | | | 416/185 |
| 6,622,724 | B1 * | 9/2003 | Truitt | A61M 16/022 |
| | | | | 128/204.18 |
| 7,225,809 | B1 * | 6/2007 | Bowen | A61M 16/024 |
| | | | | 128/204.21 |
| 2004/0071552 | A1 * | 4/2004 | Truitt | A61M 16/0069 |
| | | | | 416/223 R |
| 2005/0036887 | A1 * | 2/2005 | Nadjafizadeh | F04D 17/06 |
| | | | | 415/184 |
| 2007/0048159 | A1 * | 3/2007 | DiMatteo | A61M 16/0066 |
| | | | | 417/423.14 |
| 2008/0310978 | A1 * | 12/2008 | Hoffman | A61M 16/0063 |
| | | | | 415/203 |
| 2012/0199129 | A1 * | 8/2012 | Kenyon | F04D 29/441 |
| | | | | 128/205.25 |
| 2013/0230421 | A1 * | 9/2013 | Teramoto | F04D 17/16 |
| | | | | 417/423.14 |
| 2013/0236303 | A1 * | 9/2013 | Teramoto | F04D 29/4233 |
| | | | | 415/206 |
| 2014/0023516 | A1 * | 1/2014 | Ruck | F04D 29/30 |
| | | | | 416/242 |
| 2014/0158131 | A1 * | 6/2014 | Kenyon | F04D 25/082 |
| | | | | 128/204.18 |
| 2015/0219119 | A1 * | 8/2015 | Nitta | F04D 29/4233 |
| | | | | 415/115 |
| 2016/0138611 | A1 | 5/2016 | Teramoto | |
| 2017/0211438 | A1 | 7/2017 | Suzuki et al. | |

FOREIGN PATENT DOCUMENTS

| | | | |
|---|---|---|---|
| GB | 161464 A | * | 4/1921 |
| JP | S54-61306 A | | 5/1979 |
| JP | 04164194 A | * | 6/1992 |
| JP | H04-164194 A | | 6/1992 |
| JP | 2010-078274 A | | 4/2010 |
| JP | 2013-189878 A | | 9/2013 |
| JP | 2016-034411 A | | 3/2016 |
| JP | 2016-102491 A | | 6/2016 |
| JP | 2017-008920 A | | 1/2017 |
| JP | 2017-036723 A | | 2/2017 |
| KR | 20170041926 A | * | 4/2017 |

OTHER PUBLICATIONS

English translation for JPH-04164194, machine translated by espacenet.com.*
International Search Report for PCT/JP2019/021978 dated Aug. 20, 2019.
Written Opinion for PCT/JP2019/021978 dated Aug. 20, 2019.
Japanese Office action for Application No. 2020-523092 dated Jul. 6, 2021.

* cited by examiner

Fig.12A
Fig.12B
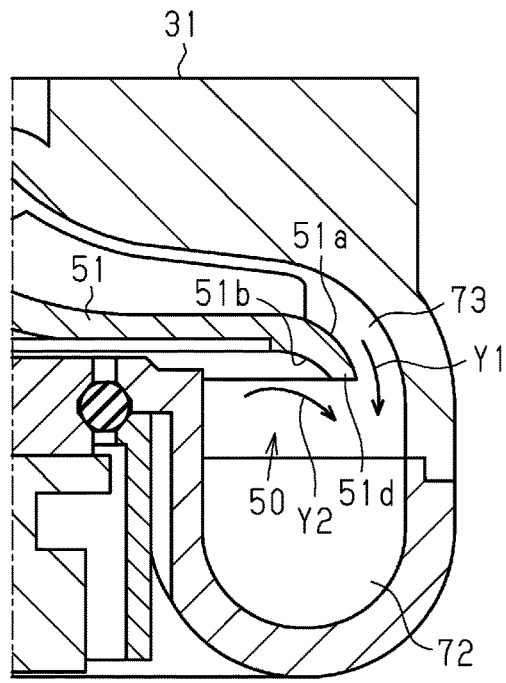
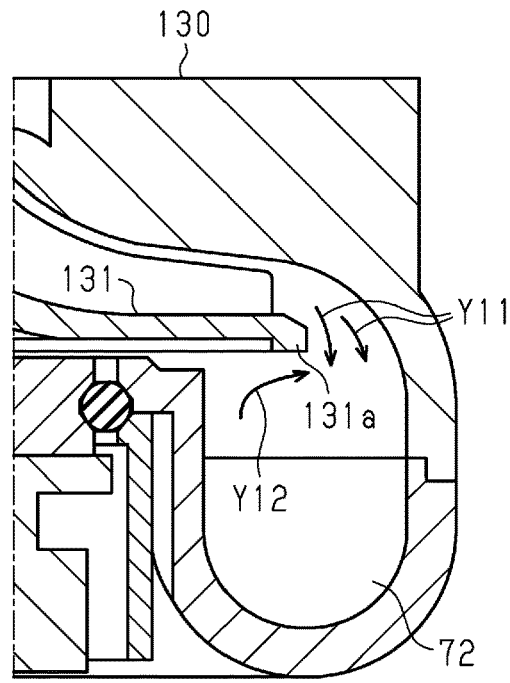
Fig.13
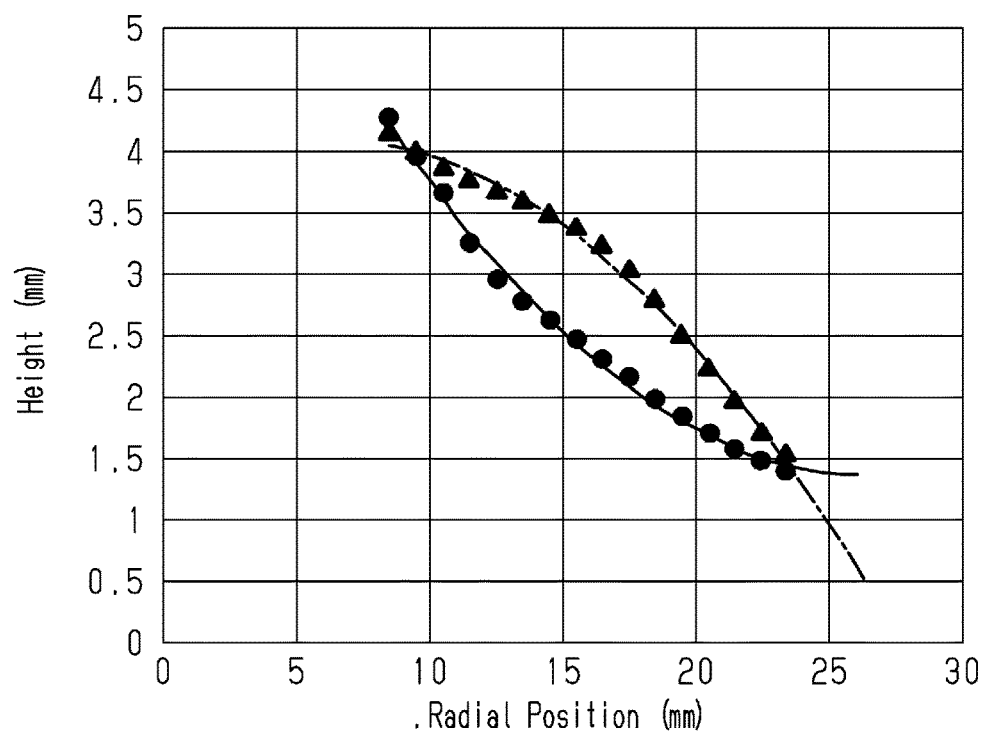

BLOWING DEVICE AND FLUID CONTROL DEVICE

CROSS REFERENCE TO RELATED APPLICATION

This is a continuation of International Application No. PCT/JP2019/021978 filed on Jun. 3, 2019, which claims priority from Japanese Patent Application No. 2018-107776 filed on Jun. 5, 2018. The contents of these applications are incorporated herein by reference in their entireties.

TECHNICAL FIELD

The present disclosure relates to an air blower and a fluid controller used for positive airway pressure (PAP) and the like.

BACKGROUND ART

A conventional fluid controller such as a continuous positive airway pressure (CPAP) device (hereafter referred to as CPAP device) is used to treat sleep-related disorders such as obstructive sleep apnea (OSA). The CPAP device includes an air blower with a built-in fan and supplies a mask covering the mouth or the nose of a patient with gas (such as air) under pressure that is higher than the atmospheric pressure. The CPAP device needs to be quiet as it is used while the patient is asleep. A known CPAP device includes a mechanism that reduces the noise of air flowing into the device (refer to, for example, Patent Document 1).

Prior Art Document

Patent Document 1: Japanese Laid-Open Patent Publication No. 2016-34411

BRIEF SUMMARY

Problems that the Disclosure is to Solve

When the flow of air is disturbed in a fan unit, the discharge efficiency of the air blower in the CPAP device or the like may decrease. It is an object of the present disclosure to provide an air blower that efficiently discharges air and a fluid controller.

Means for Solving the Problems

According to one aspect of the present disclosure, an air blower includes a fan case that includes an intake port and a discharge port, a fan arranged in the fan case, in which the fan includes blades and a holding plate, the holding plate includes a first surface on which the blades are arranged and a second surface at a side opposite to the first surface, a first passage connected to the intake port and encompassed by the first surface of the holding plate, an inner surface of the fan case, and two adjacent ones of the blades, and a second passage connected to the discharge port in the holding plate at a side of the second surface. The holding plate includes an outer circumferential end section located outward from the blades. The outer circumferential end section is flared so that the outer circumferential end section extends downward toward an outer side of the holding plate so as to increase inclination. With this structure, air is efficiently discharged.

According to another aspect of the present disclosure, a fluid controller includes the air blower and a controller that controls the air blower. With this structure, the air blower has good discharge efficiency and the controller causes the air blower to discharge necessary air.

According to one aspect of the present disclosure, an air blower that efficiently discharges air and a fluid controller are provided.

BRIEF DESCRIPTION OF THE DRAWINGS

FIG. 12A is a partially enlarged cross-sectional view of the fan unit in the first embodiment;

FIG. 12B is a partially enlarged cross-sectional view of a fan unit in a first comparative example;

FIG. 13 is a graph showing radial position-passage height characteristics of the first embodiment and a second comparative example;

DETAILED DESCRIPTION

Embodiments of the present disclosure will now be described below. In the accompanying drawings, elements are illustrated for simplicity and clarity and have not necessarily been drawn to scale. An element may be sized differently from the actual element. Further, an element may be sized differently between drawings. Hatching lines may be omitted from several elements in the cross-sectional views to facilitate understanding.

Figure 1:
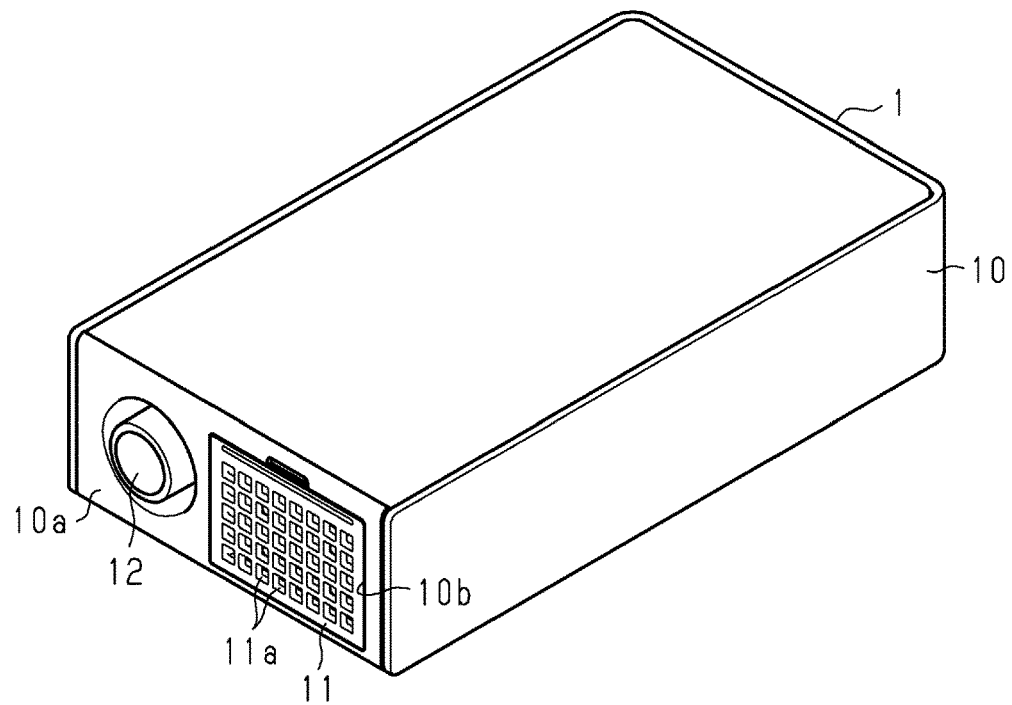
FIG. 1 is a schematic perspective view of a fluid controller according to a first embodiment.

As shown in FIG. 1, a fluid controller 1 according to a first embodiment includes a rectangular parallelepiped case 10. The case 10 includes a side surface 10a to which a suction panel 11 is attached. The case 10 also includes a discharge port 12 in the side surface 10a. The suction panel 11 is attached to an open portion 10b of the case 10. The suction panel 11 includes suction ports 11a arranged in a lattice. The suction panel 11 draws ambient air into the case 10. The suction panel 11 includes, for example, a filter attached to the case 10 in a removable manner. The fluid controller 1 discharges the ambient air drawn through the suction ports 11a and out of the discharge port 12. The attachment position of the suction panel 11, and the shape, arrangement, and the like of the suction ports 11a may be changed.

Figure 2:
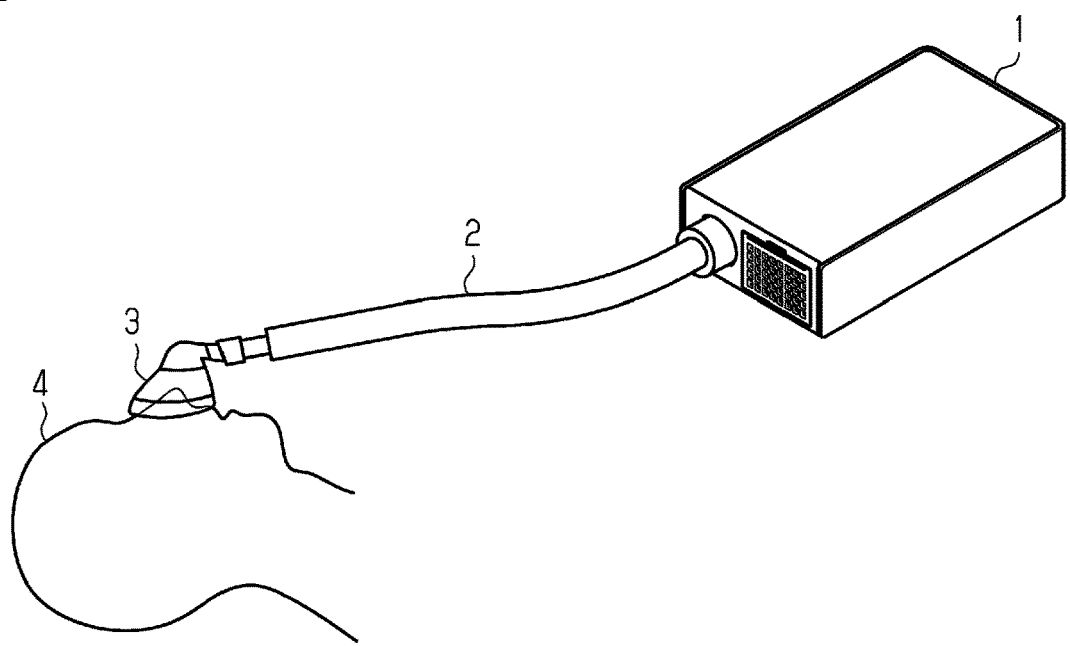
FIG. 2 is a diagram showing the fluid controller in use.

As shown in FIG. 2, the fluid controller 1 is used as, for example, a continuous positive airway pressure (CPAP) device. The fluid controller 1 is connected to a mask 3 by a tube 2. The mask 3 covers the nose or the mouth of a patient 4. The fluid controller 1 supplies fluid (such as air) having a desired pressure to the patient 4 through the tube 2 and the mask 3.

The state of the patient 4 (such as exhalation) may be determined to control the pressure of gas supplied to the patient 4 in accordance with the determined state. The fluid controller 1 estimates, for example, an exhalation state of the patient 4 wearing the mask 3 and controls the pressure of the supplied gas in synchronization with the exhalation state. For example, the pressure during inhalation is 1000 Pa, and the pressure during exhalation is 700 Pa. When the patient 4 is in the exhalation state, the pressure of the supplied gas is lowered to mitigate breathing difficulty of the patient 4.

Figure 3:
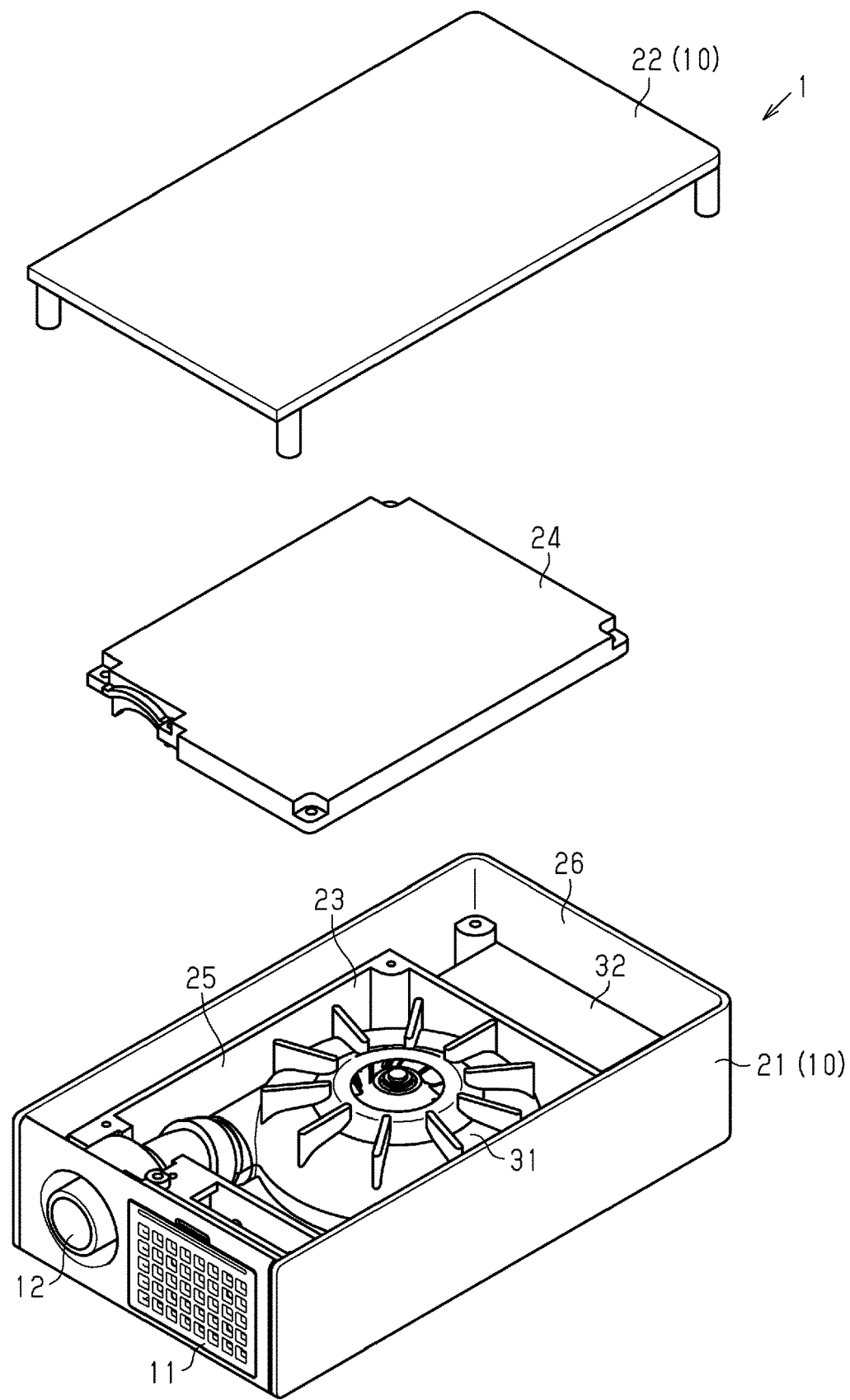
FIG. 3 is an exploded perspective view of the fluid controller.

As shown in FIG. 3, the case 10 of the fluid controller 1 includes a case body 21 having an open upper part and a cover member 22 that closes the opening of the case body 21. The case body 21 includes the discharge port 12. The suction panel 11 is attached to the case body 21.

The case body 21 includes a partitioning portion 23. The partitioning portion 23 has the form of a rectangular frame and includes an open upper part. The partitioning portion 23 is formed integrally with the case body 21. The opening of the partitioning portion 23 is closed by an inner cover 24 fixed to the partitioning portion 23. The case body 21 includes an air blowing chamber 25 surrounded by the partitioning portion 23 and the inner cover 24. The air blowing chamber 25 accommodates a fan unit 31. The case body 21 also includes a control chamber 26 located at the side of the air blowing chamber 25 opposite to the suction panel 11. The control chamber 26 accommodates a control unit 32. The control unit 32 includes a control board and the like and is schematically illustrated having a rectangular parallelepiped shape. The control unit 32 controls the fan unit 31. The fluid controller 1, which includes the fan unit 31 and the control unit 32, controls fluid (air).

Figure 5:
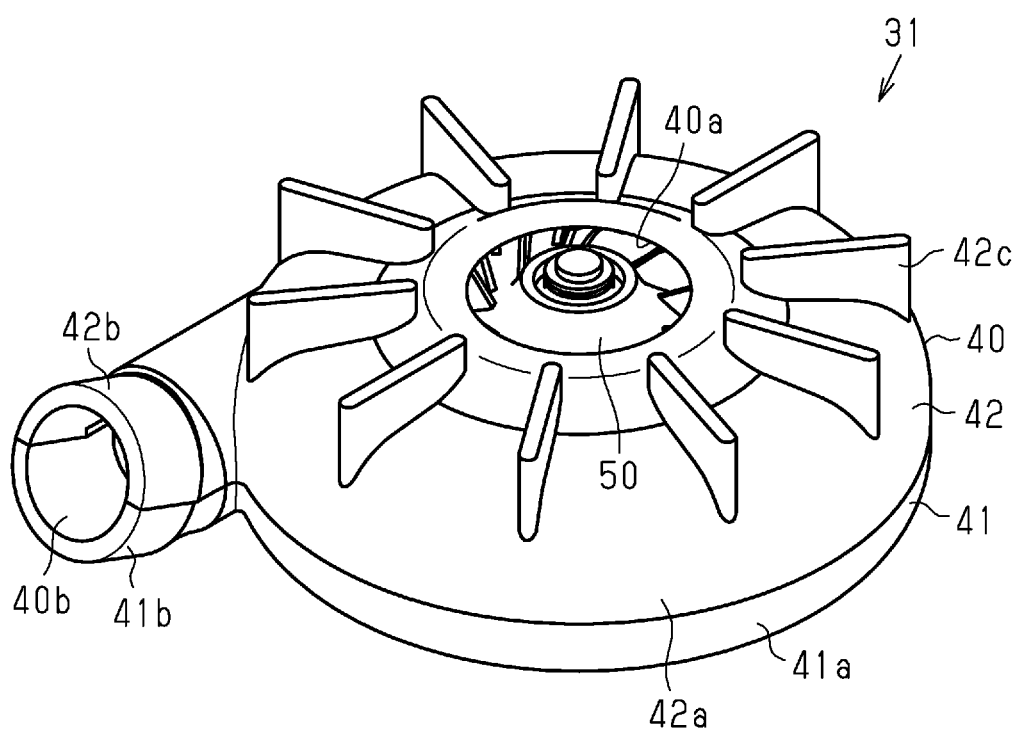
FIG. 5 is a schematic perspective view of a fan unit of the fluid controller.
Figure 6:
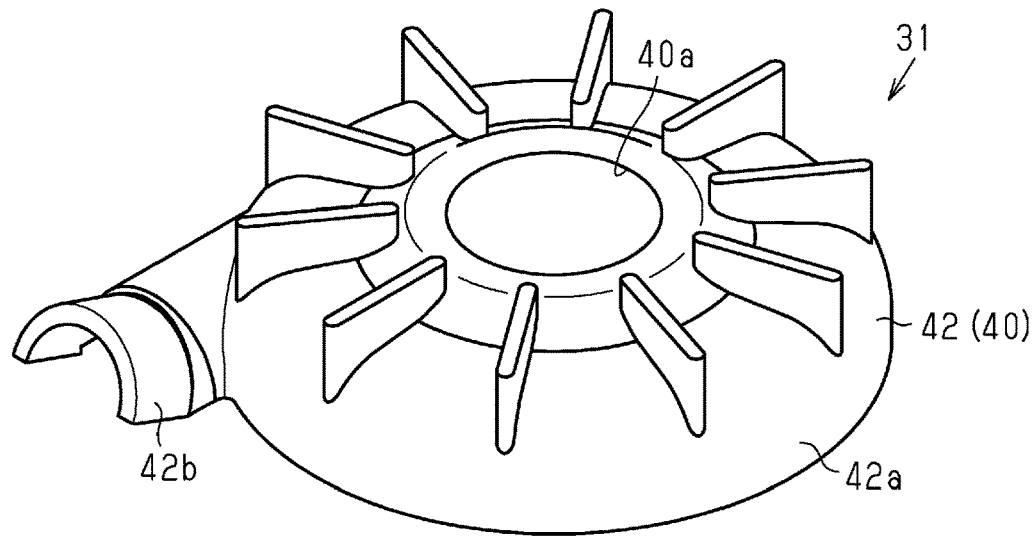
FIG. 6 is an exploded perspective view of the fan unit.
Figure 6:
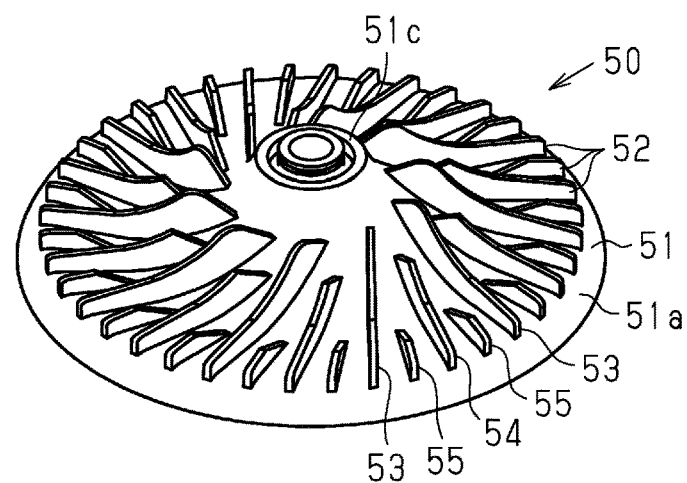
Figure 6:
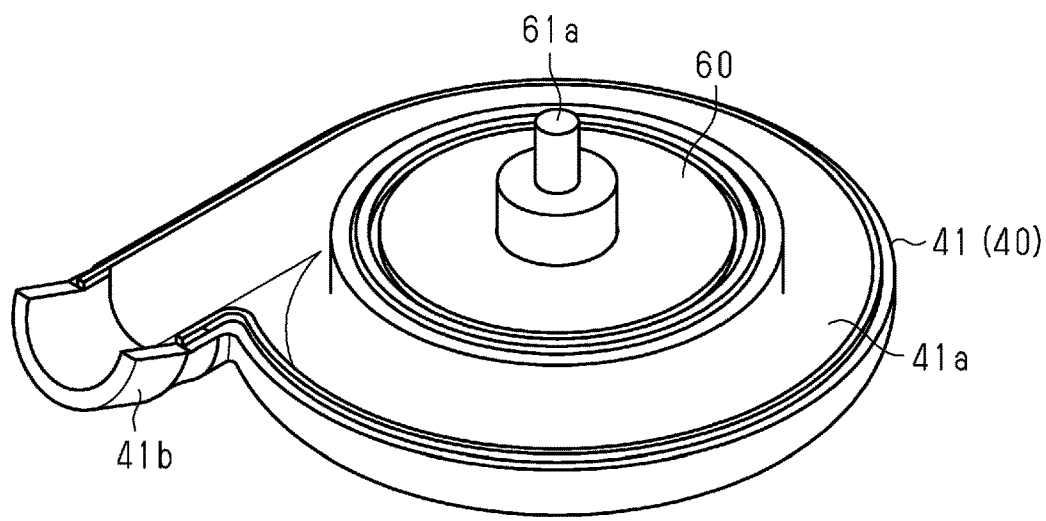
Figure 8:
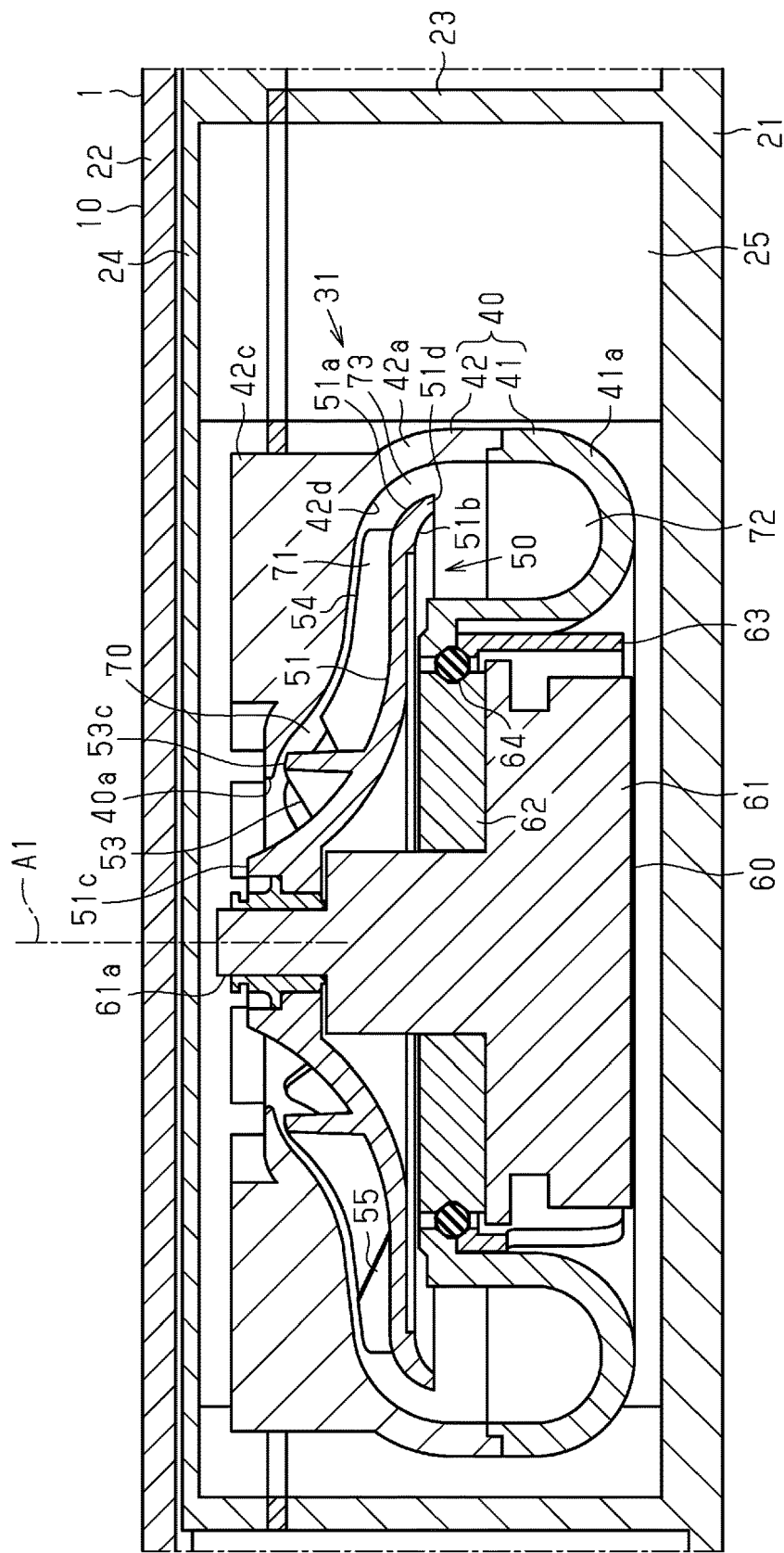
FIG. 8 is a partial cross-sectional view of the fluid controller.

As shown in FIGS. 5, 6, and 8, a fan case 40 of the fan unit 31 includes an intake port 40a at an upper portion and a discharge port 40b that projects at a side portion. The fan case 40 accommodates a fan 50 having a center axis A1. It is to be appreciated that for the purposes of this disclosure, the center axis A1 of the fan 50 defines radial and axial directions of the fan unit 31 and its elements As shown in FIGS. 5, 6, and 8, the fan case 40 includes a lower case 41 and an upper case 42. The lower case 41 includes a passage portion 41a and a discharge portion 41b. The passage portion 41a is shaped to be annular. As shown in FIG. 8, the passage portion 41a has a U-shaped cross-section. The discharge portion 41b is shaped to extend from the passage portion 41a in a predetermined direction, more specifically, in a tangential direction of the annular passage portion 41a in the present embodiment. A motor 60 that drives and rotates the fan 50 is attached to the inner side of the passage portion 41a. The motor 60 includes a rotary shaft 61a to which the fan 50 is fixed. The width of the passage portion 41a around the rotary shaft 61a of the motor 60 in the radial direction is the same or substantially the same. That is, in the fan case 40 (lower case 41) of the present embodiment, the rotary shaft 61a of the motor 60 is not eccentric to the annular passage portion 41a.

As shown in FIG. 8, the motor 60 includes a motor body 61 and a fixing plate 62. The fixing plate 62 is shaped to be, for example, circular in a plan view. The fixing plate 62 is fixed to the motor body 61 by a screw or the like (not shown). A substantially cylindrical fixing member 63 is attached to the inner side of the lower case 41. An O-ring 64 serving as an elastic member is arranged between the lower case 41, the fixing member 63, and the fixing plate 62 of the motor 60. The motor 60 is supported by the lower case 41 and the fixing member 63 by way of the O-ring 64.

As shown in FIGS. 5 and 6, the upper case 42 includes a passage portion 42a and a discharge portion 42b. The passage portion 42a is shaped to be annular and has a central opening serving as the intake port 40a through which air is drawn into the fan case 40. The discharge portion 42b is shaped to extend from the passage portion 42a in a predetermined direction, more specifically, in a tangential direction of the annular passage portion 42a in the present embodiment. Guiding walls 42c extend from the upper surface of the upper case 42. The guiding walls 42c are each shaped to extend in the radial direction of the upper case 42. As shown in FIG. 8, the upper ends of the guiding walls 42c are formed to be substantially parallel with the inner cover 24.

As shown in FIG. 8, the fan 50 is fixed to the rotary shaft 61a of the motor 60. The motor 60, when the motor body 61 is supplied with power, drives and rotates the rotary shaft 61a, and the rotary shaft 61a is rotated integrally with the fan 50.

Figure 7:
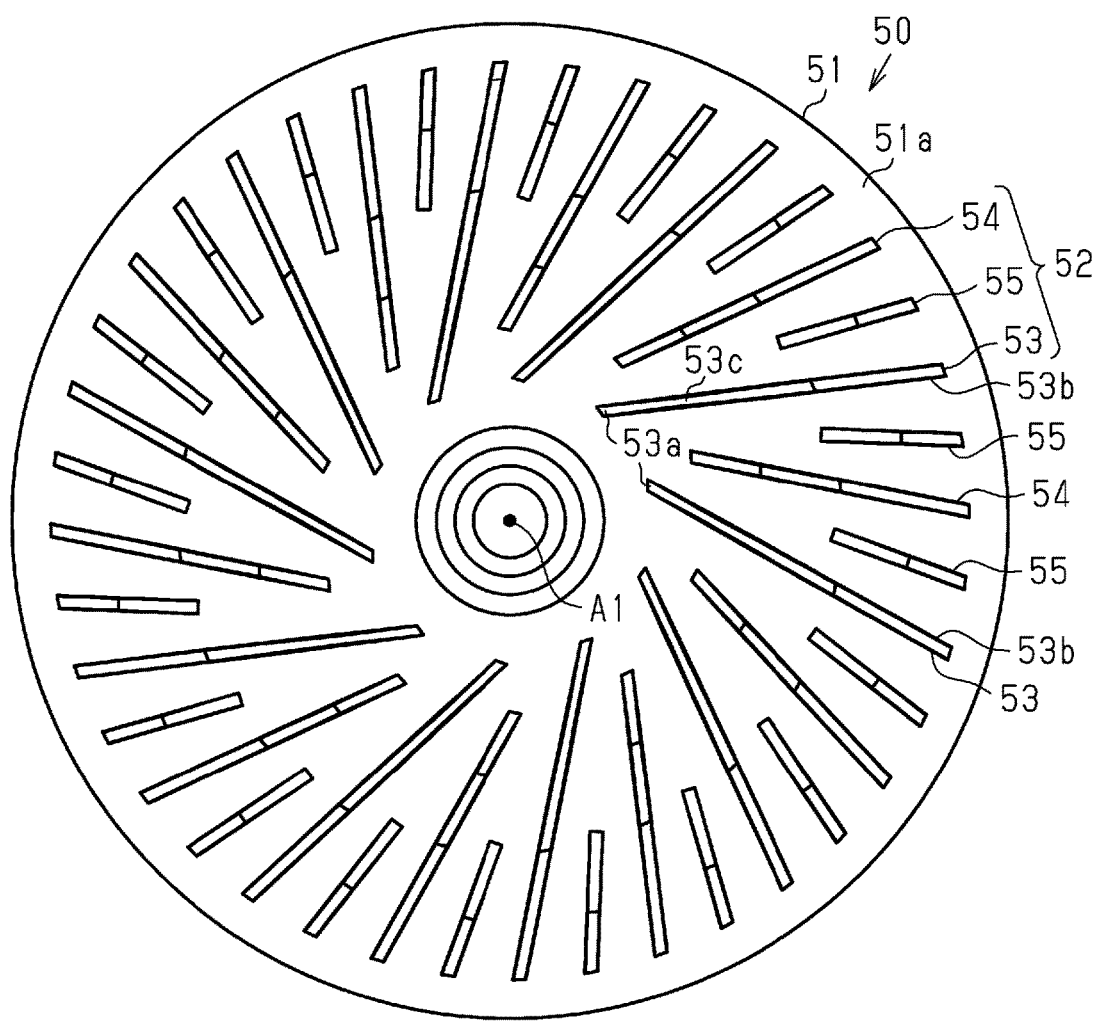
FIG. 7 is a plan view of a fan of the fan unit.

As shown in FIGS. 6 to 8, the fan 50 includes a holding plate 51 and blades 52. As shown in FIG. 8, the holding plate 51 is rotationally supported and includes a first surface 51a and a second surface 51b. The first surface 51a is arranged at the upper side of the holding plate 51 directed toward the intake port 40a of the fan case 40. The second surface 51b is arranged at the lower side of the holding plate 51 directed toward the motor body 61.

The first surface 51a of the holding plate 51 has an inner circumference, which defines a fixing portion 51c fixed to the rotary shaft 61a, and an outer circumference. The first surface 51a is inwardly curved from the fixing portion 51c so as to extend downward and radially outward and so that the inclination gradually reduces toward the outer circumference. The outer circumferential side of the first surface 51a extends substantially parallel to a plane that is orthogonal to the center axis of the holding plate 51. Further, the holding plate 51 includes an outer circumferential end section 51d that has a flared shape. The first surface 51a at the outer circumferential end section 51d is a curved surface (rounded surface) that is upwardly bulged to extend downward and radially outward and so that the inclination becomes steep at the outer circumference of the first surface 51a.

The second surface 51b of the holding plate 51 has an inner circumference, which defines the fixing portion 51c, and an outer circumference. The second surface 51b extends from the fixing portion 51c, which is fixed to the rotary shaft 61a, downward and radially outward and so that the inclination gradually reduces toward the outer circumference. The second surface 51b at the outer circumferential side extends substantially parallel to a plane that is orthogonal to the center axis of the holding plate 51. The second surface 51b at the outer circumferential end section 51d of the holding plate 51 then curves downward and radially outward and has an inclination that becomes steep at the outer circumference of the second surface 51b.

The outer circumferential end section 51d of the holding plate 51 becomes thinner toward the distal end at the radially outer side. The second surface 51b is curved so that the thickness of the holding plate 51 from the first surface 51a decreases toward the distal end at the outer circumferential end section 51d. Preferably, the thickness (width in radial direction) at the distal end of the holding plate 51 is less than or equal to 1 mm. The thickness is 1 mm in the present embodiment.

As shown in FIGS. 6 to 8, the blades 52 project upward from the first surface 51a of the holding plate 51. As shown in FIG. 7, the blades 52 are radially arranged as viewed in the direction of the center axis A1 of the holding plate 51. The blades 52 are arranged so that the center of gravity of the fan 50 corresponds to the center axis A1.

Specifically, the blades 52 extend from the central region of the holding plate 51 toward the outer end of the holding plate 51 as viewed in the center axis direction of the holding plate 51. In the present embodiment, the blades 52 each extend straight. The proximal end of each blade 52 (i.e., the end that is closer to the center axis A1 of the fan 50) is located rotationally forward from the other end (i.e., the end that is farther from the center axis A1 of the fan 50) in the rotation direction of the fan 50 (counterclockwise in FIG. 7).

As shown in FIG. 7, the blades 52 of the fan 50 include first blades 53, second blades 54, and third blades 55. The first blades 53 to the third blades 55 have different lengths in the radial direction. Specifically, each first blade 53 extends from an inner first radial position of the first surface 51a of the holding plate 51 to the vicinity of the outer circumferential end section 51d. Each second blade 54 extends from a second radial position of the first surface 51a to the vicinity of the outer circumferential end section 51d, the second radial portion being radially outward from the first radial position. Each third blade 55 extends from a third radial position of the first surface 51a to the vicinity of the outer circumferential end section 51d, the third radial position being radially outward from the second radial position. The distal ends of the first blades 53 to the third blades 55 at the outer side in the radial direction lie on the same circumference.

In the present embodiment, the first blades 53 and the second blades 54 are alternately arranged in the circumferential direction of the holding plate 51. The third blades 55 are arranged between the first blades 53 and the second blades 54.

Figure 4:
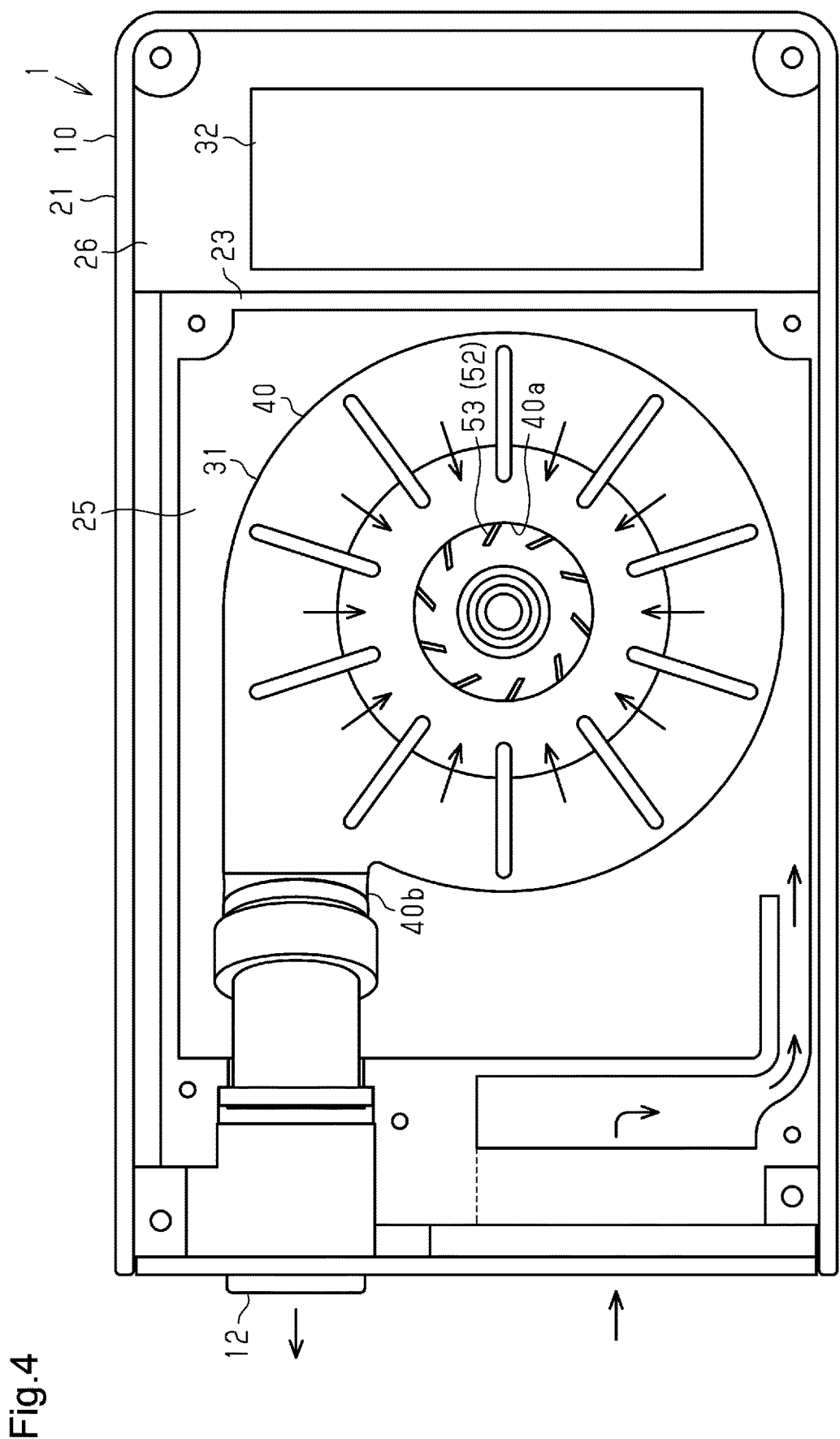
FIG. 4 is a schematic plan view showing the fluid controller without a top cover and an inner cover.

As shown in FIG. 4, the inner (proximal) ends of the first blades 53 are located radially inward from the intake port 40a of the fan case 40 to be exposed from the intake port 40a. Thus, the inner first radial position of each first blade 53 is set radially inward from the intake port 40a of the fan case 40.

As shown in FIG. 8, each first blade 53 includes a vertex 53c between an inner end 53a and an outer end 53b on the first surface 51a of the holding plate 51. The first blade 53 becomes higher from the inner end 53a to the vertex 53c and lower from the vertex 53c toward the outer end 53b. FIG. 8 shows a cross-section of the fan 50 in a plane that includes the center axis A1 of the fan 50 and extends through the vertex 53c. As shown in FIG. 8, the first blade 53 is arranged so that the vertex 53c overlaps the upper case 42 in a direction parallel to the rotary shaft 61a of the fan 50. The upper case 42 includes the circular intake port 40a. Thus, the vertex 53c of the first blade 53 is located radially outward from the open end of the intake port 40a.

Figure 9:
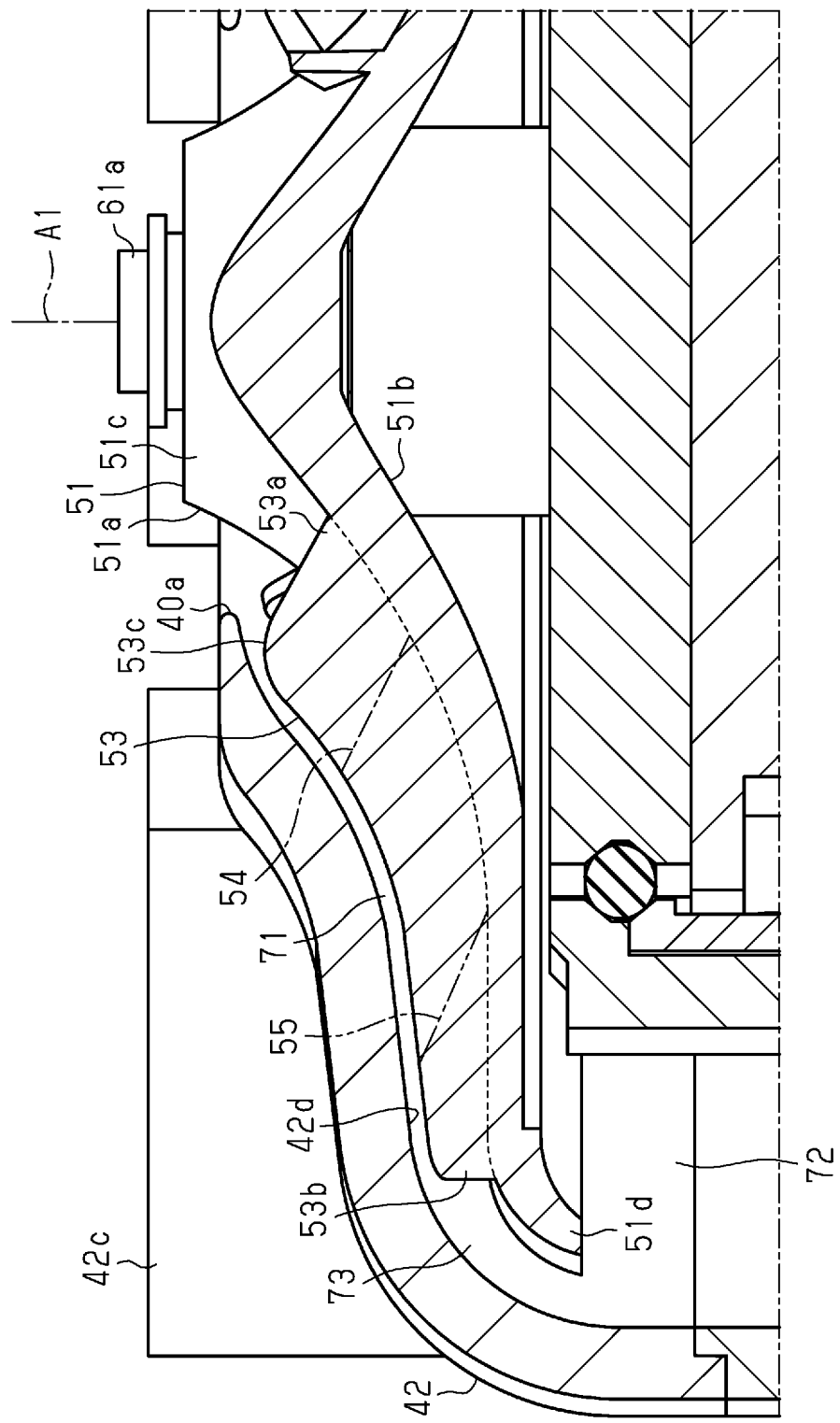
FIG. 9 is a partially enlarged cross-sectional view of the fan unit.

In FIG. 9, the long-dash short-dash line shows the shape of the second blade 54 and the long-dash double-short-dash line shows the shape of the third blade 55 at their inner circumferential ends. The shapes of the second blade 54 and the third blade 55 at their outer circumferential ends (i.e., distal ends) conform to the shape of the first blade 53.

The fan unit 31 includes a passage 70 extending from the intake port 40a of the fan case 40 to the discharge port 40b of the fan case 40. In the present embodiment, the passage 70 includes a first passage 71 connected to the intake port 40a of the fan case 40 and a second passage 72 connected to the discharge port 40b of the fan case 40. The passage 70 also includes a buffer passage 73 located between the first passage 71 and the second passage 72. The passage 70 (first passage 71, second passage 72, and buffer passage 73) will now be described in detail.

The area between the first surface 51a of the holding plate 51 and an inner surface 42d of the upper case 42, which is opposed to the first surface 51a of the holding plate 51, includes a region where the blades 52 (first blades 53 to third blades 55) are formed and a region where the blades 52 (first blades 53 to third blades 55) are not formed. In the present embodiment, the first passage 71 is defined by a portion of the first surface 51a of the holding plate 51 extending from the first radial position to the third radial position of the blades 52, the inner surface 42d of the upper case 42, and two adjacent blades 52 in the rotation direction. The first passage 71 is connected to the intake port 40a of the fan case 40.

The buffer passage 73 is defined by outer circumferential end section 51d of the holding plate 51, where the blades 52 (first blades 53 to third blades 55) are not formed, and the inner surface 42d of the upper case 42.

Figure 10:
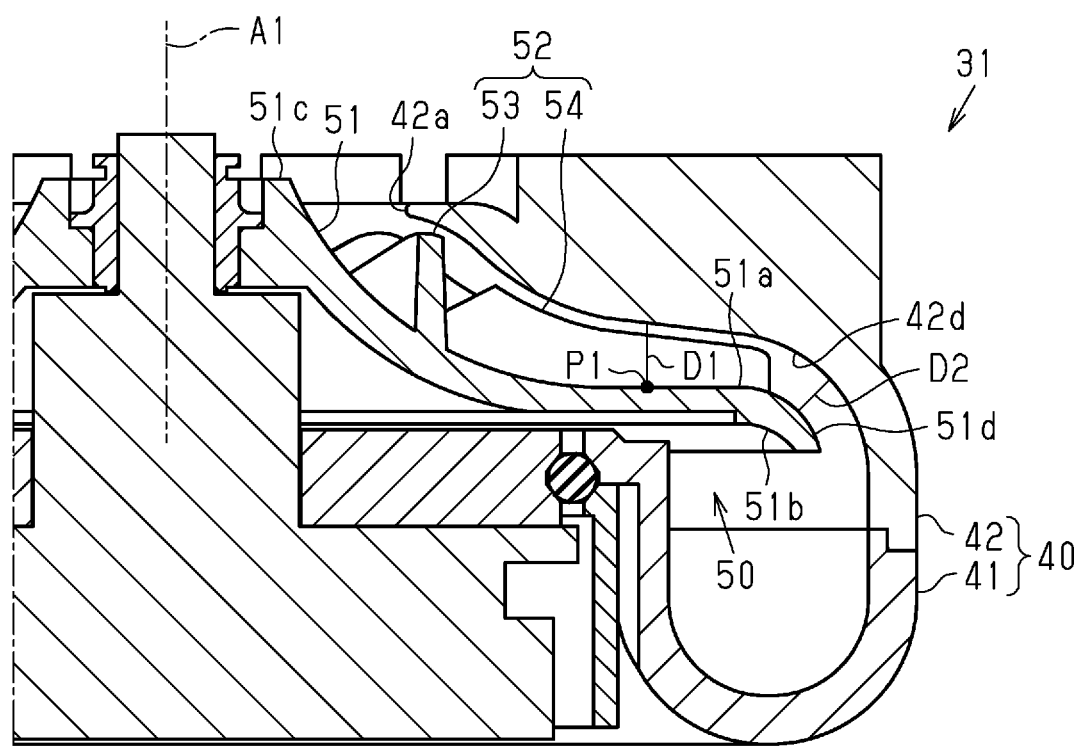
FIG. 10 is a partially enlarged cross-sectional view of the fan unit.

The second passage 72 extends from the buffer passage 73 to the discharge port 40b of the fan case 40. As shown in FIG. 10, between the fan case 40 (upper case 42) and the holding plate 51, the distance D1 (also referred to as the shortest distance) from the first surface 51a of the holding plate 51 to the inner surface 42d of the upper case 42, which is opposed to the first surface 51a of the holding plate 51, decreases toward the outer circumferential end section 51d of the holding plate 51. The distance D1 sets the cross-sectional area and the height of the first passage 71.

In the present disclosure, the cross-sectional area of the first passage 71 at a given point along the first surface 51a is determined by the area of a plane that is orthogonal to the first surface 51a at the point and includes a line segment extending from the first surface 51a of the holding plate 51 to the upper case 42. The plane is obtained from a path of the line segment that is rotated about the center axis of the holding plate. In the present embodiment, the first surface 51a of the holding plate 51 and the inner surface 42d of the upper case 42 are formed so that the cross-sectional area at the proximal end of the first passage 71 (i.e., the end that is closer to the intake port 40a) is greater than the cross-sectional area at the other end of the first passage 71 (i.e., the end that is closer to the second passage 72). However, the first surface 51a of the holding plate 51 and the inner surface 42d of the upper case 42 may be formed so that the cross-sectional area at the end of the first passage 71 closer to the intake port 40a is the same as the cross-sectional area at the end of the first passage 71 that is closer to the second passage 72.

In the present disclosure, the height of the first passage 71 at a given point along the first surface 51a is obtained by dividing the cross-sectional area of the first passage 71 at the given point by the circumferential length of a circle that passes through the point. The circumference length of the circle that passes through the point is calculated based on the radius at the point (distance between center axis A1 of holding plate 51 to point P1). In the present embodiment, the height of the first passage 71 has characteristics in which the height of the first passage 71 changes in a concave manner at the radial positions of the first surface 51*a* of the holding plate 51. The concave characteristics will be described further below with reference to FIG. 13.

In the fan case 40 (upper case 42) and the holding plate 51, the distance D2 (also referred to as the shortest distance) from the first surface 51*a* of the holding plate 51 to the inner surface 42*d* of the upper case 42 decreases toward the outer circumferential end section 51*d* of the holding plate 51. The distance D2 sets the cross-sectional area and the height of the buffer passage 73.

In the present disclosure, the cross-sectional area of the buffer passage 73 at a given point along the first surface 51*a* is determined by the area of a plane that is orthogonal to the first surface 51*a* at the point and includes a line segment extending from the first surface 51*a* of the holding plate 51 to the upper case 42. The plane is obtained from a path of the line segment that is rotated about the center axis of the holding plate. In the present embodiment, the first surface 51*a* of the holding plate 51 and the inner surface 42*d* of the upper case 42 are formed so that the cross-sectional area of the buffer passage 73 is substantially constant or gradually reduced from the intake port 40*a* to the second passage 72.

Operation

The operation of the fluid controller 1 and the fan unit 31 will now be described. As shown in FIG. 4, the fluid controller 1 includes the rectangular parallelepiped case 10 and the fan unit 31 accommodated in the air blowing chamber 25 that is surrounded by the partitioning portion 23 and the inner cover 24 inside the case 10.

Further, as shown in FIG. 6, the fan unit 31 includes the fan case 40 and the fan 50. The fan case 40 includes the intake port 40*a* and the discharge port 40*b*. The fan 50 arranged in the fan case 40 includes the holding plate 51, which includes the first surface 51*a* and is rotationally supported, and the blades 52 (first blades 53 to third blades 55), which extend from the first surface 51*a* of the holding plate 51.

As shown in FIG. 8, the fan unit 31 includes the passage 70 extending from the intake port 40*a* of the fan case 40 to the discharge port 40*b* of the fan case 40. The passage 70 includes the first passage 71 connected to the intake port 40*a*, the second passage 72 connected to the discharge port 40*b*, and the buffer passage 73 located between the first passage 71 and the second passage 72. The region between the first surface 51*a* of the holding plate 51 and the inner surface 42*d* of the upper case 42 includes a region where the blades 52 (first blades 53 to third blades 55) are formed and a region where the blades 52 (first blades 53 to third blades 55) are not formed. In the present embodiment, the first passage 71 is the region encompassed by the surface of the first surface 51*a* of the holding plate 51 that extends from the first radial position to the third radial position, the inner surface 42*d* of the upper case 42, and two adjacent blades 52.

Further, as shown in FIG. 12A, in the fan unit 31 of the present embodiment, the holding plate 51 includes the outer circumferential end section 51*d* that has a flared shape. The first surface 51*a* at the outer circumferential end section 51*d* is a curved surface (rounded surface) that is upwardly bulged to extend downward and radially outward so that the inclination becomes steep.

A first comparative example of the present embodiment will now be described. FIG. 12B shows part of the first comparative example of the present embodiment. In a fan unit 130 of the first comparative example, the surface of a holding plate 131 at an outer circumferential end section 131*a* is straightly cut away in a cross-section. Further, a radially outward side surface of the outer circumferential end section 131*a* extends parallel to the center axis.

In the first comparative example, the flow along the front surface of the holding plate 131 changes abruptly. Thus, the pressure at such a portion increases and may deteriorate characteristics or generate a backflow. The generation of a backflow will disturb the flow. The disturbed flow will interfere with the blades and produce noise.

Conversely, in the present embodiment, the outer circumferential end section 51*d* of the holding plate 51 is flared. This gradually curves the flow so that pressure changes are reduced and characteristic deterioration and backflows are limited. This improves the characteristics.

Further, in the present embodiment, the distance D1 from the first surface 51*a* of the holding plate 51 to the inner surface 42*d* of the fan case 40, which is opposed to the first surface 51*a*, is decreased toward the outer circumferential end section 51*d* of the holding plate 51 in accordance with the radius of that position. With this structure, the air drawn from the intake port 40*a* will increase in flow speed and form a smooth airflow when flowing to the discharge port 40*b* through the first passage 71. This reduces noise as a result.

The blades 52 (first blades 53 to third blades 55) extend from the central region of the holding plate 51 to the outer end of the holding plate 51 as viewed in the center axis direction of the fan 50. The end of each blade 52 that is closer to the center axis A1 of the fan 50 is located rotationally forward from the other end in the rotation direction of the fan 50. The cross-sectional area of the first passage 71 is substantially constant or gradually reduced from the intake port 40*a* to the second passage 72. The fan unit 31 has characteristics in which the height of the first passage 71 changes in a concave manner at the radial positions. The fan unit 31 configured in this manner does not reduce the flow speed of fluid. This restricts the separation of fluid and the generation of swirls, thereby restricting disturbance in the flow of fluid and reducing noise.

If the cross-sectional area of the first passage 71 increases in the direction in which fluid flows, a force that reduces the speed of the fluid acts on the fluid. As a result, the fluid is more likely to be interfered by the components of a flow passage. This may result in the occurrence of separation effect, which hinders the flow in a single direction, or the formation of a swirl. The separation effect of fluid and the formation of a swirl will lead to flow disturbance or pressure fluctuation that increase the noise caused by the flow. In the present embodiment, the cross-sectional area of the first passage 71 at the end that is closer to the intake port 40*a* is the same or greater than the cross-sectional area of the first passage 71 at the end that is closer to the second passage 72 so that the air entering the intake port 40*a* and flowing via the first passage 71 to the discharge port 40*b* increases in speed and forms a smooth airflow. As a result, noise is reduced. This limits disturbance in the flow of fluid and reduces noise.

If the cross-sectional area of the first passage 71 is gradually reduced, the flow speed of fluid flowing out of the outer ends the blades 52 (first blades 53 to third blades 55)

will be increased. With this structure, when swirls are generated at the outer ends the blades 52 (first blades 53 to third blades 55), the swirls will flow at a high speed toward the second passage 72 without interfering with the rearward side of the blades 52 (first blades 53 to third blades 55) in the rotation direction. This limits disturbance in the flow of fluid and reduces pressure fluctuation thereby reducing noise.

The buffer passage 73 is the defined by the outer circumferential end section 51d of the holding plate 51, where the blades 52 (first blades 53 to third blades 55) are not formed, and the inner surface 42d of the upper case 42. The first surface 51a of the holding plate 51 and the inner surface 42d of the upper case 42 are formed so that the cross-sectional area of the buffer passage 73 is substantially constant or gradually reduced from the intake port 40a toward the second passage 72.

If the cross-sectional area of the buffer passage 73 increases in the direction in which fluid flows, a force that reduces the speed of the fluid acts on the fluid. This may result in the occurrence of separation effect, which hinders the flow in a single direction, or the formation of a swirl. The separation effect of fluid and the formation of a swirl will lead to flow disturbance or pressure fluctuation that increase the noise caused by the flow. In the present embodiment, the cross-sectional area of the buffer passage 73 is the same or gradually reduced in the direction in which fluid flows. This restricts the reduction of the flow speed, thereby restricting disturbance in the flow of fluid and reducing noise.

Figure 14:
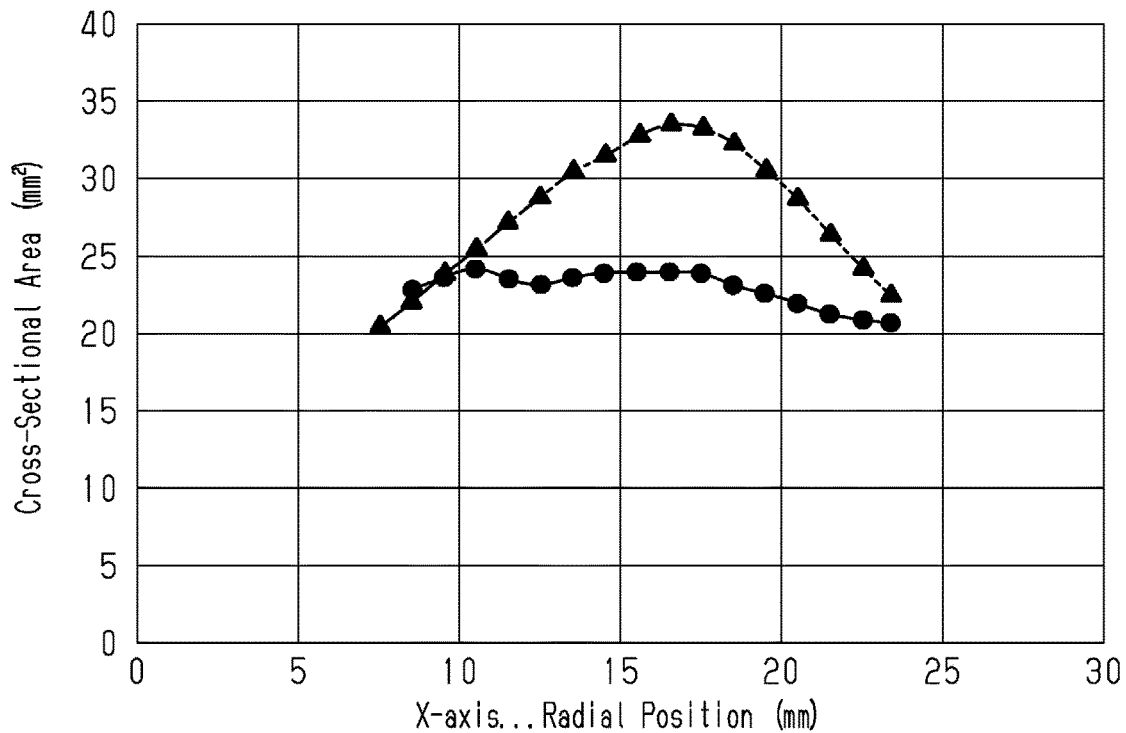
FIG. 14 is a graph showing radial position-cross-sectional area characteristics of the first embodiment and the second comparative example.

FIG. 14 shows the cross-sectional area of the first passage 71 at each radial position. In FIG. 14, the solid line and black circles show the characteristics of the present embodiment, and the long-dash short-dash line and black triangles show the characteristics of a second comparative example. In the second comparative example, the cross-sectional area of the passage gradually increases from the intake port, and then gradually decreases. In the present embodiment, the cross-sectional area of the first passage 71 is substantially constant at each radial position as compared with the second comparative example.

FIG. 13 shows the height of the first passage 71 at each radial position. In FIG. 13, the solid line and black circles show the characteristics of the present embodiment, and the long-dash short-dash line and black triangles show the characteristics of the second comparative example. The present embodiment has concave characteristics. The term "concave characteristics" used in the present disclosure indicates, as is clear from the solid line curve in FIG. 13, that the characteristics of the line appearing in the plotted region where the horizontal axis shows radial positions and the vertical axis shows the height of the first passage is a curve that is concave upward.

A loudness level (LPM) relative to pressure (back pressure) was measured in the present embodiment and the second comparative example. The loudness level was determined at a location separated from the intake port 40a of the fan unit 31 by 1 m. In the measurement, flow resistance was 10 cm $H_2O$/30 LPM and the back pressure was changed in accordance with the rotation speed of the fan 50. The back pressure was in the pressure range (from 4 cm $H_2O$ to 20 cm $H_2O$) required to use the fan unit 31 and the fluid controller 1 of the present embodiment as a CPAP device.

Figure 15:
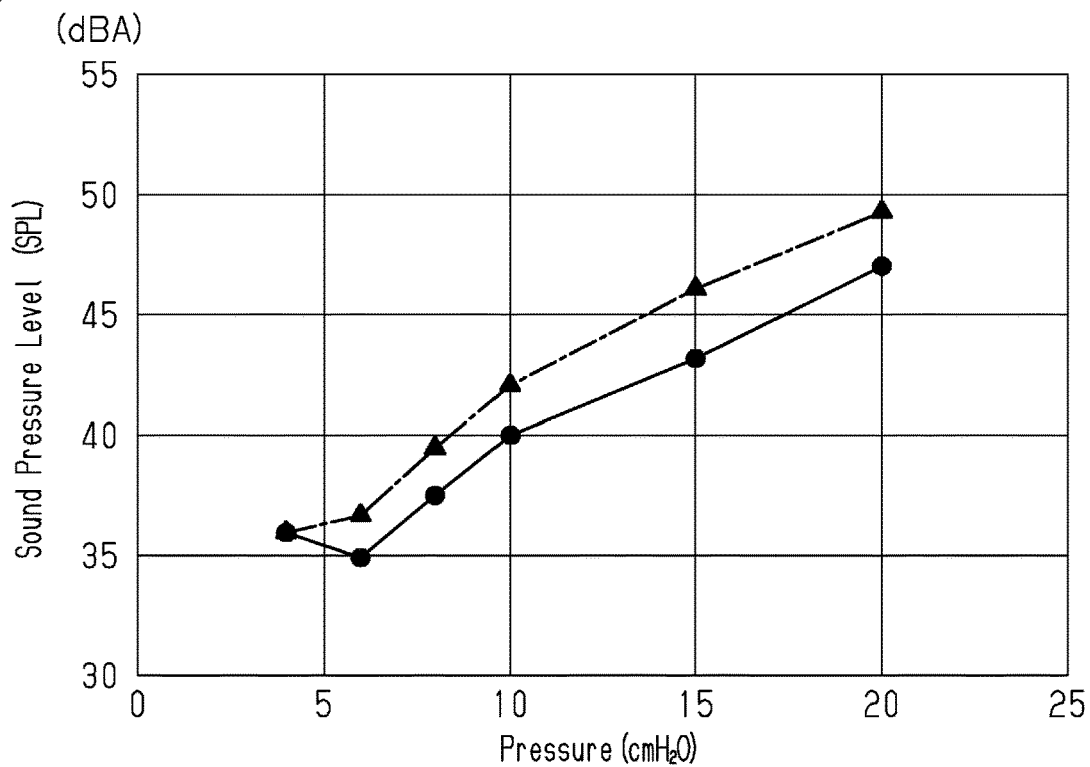
FIG. 15 is a graph showing pressure-sound pressure level characteristics of the first embodiment and the second comparative example.

The measurement results are shown in FIG. 15. In FIG. 15, the solid line and black circles show the measurement result of the fan unit 31 of the present embodiment, and the long-dash short-dash line and black triangles show the measurement result of the fan unit of the second comparative example. The fan unit 31 of the present embodiment reduces the loudness level more than the fan unit of the second comparative example.

As shown in FIG. 4, inside the fluid controller 1, air near the fan unit 31 flows toward the intake port 40a of the fan case 40 and is drawn into the fan case 40 from the intake port 40a as shown by the arrows.

Figure 11:
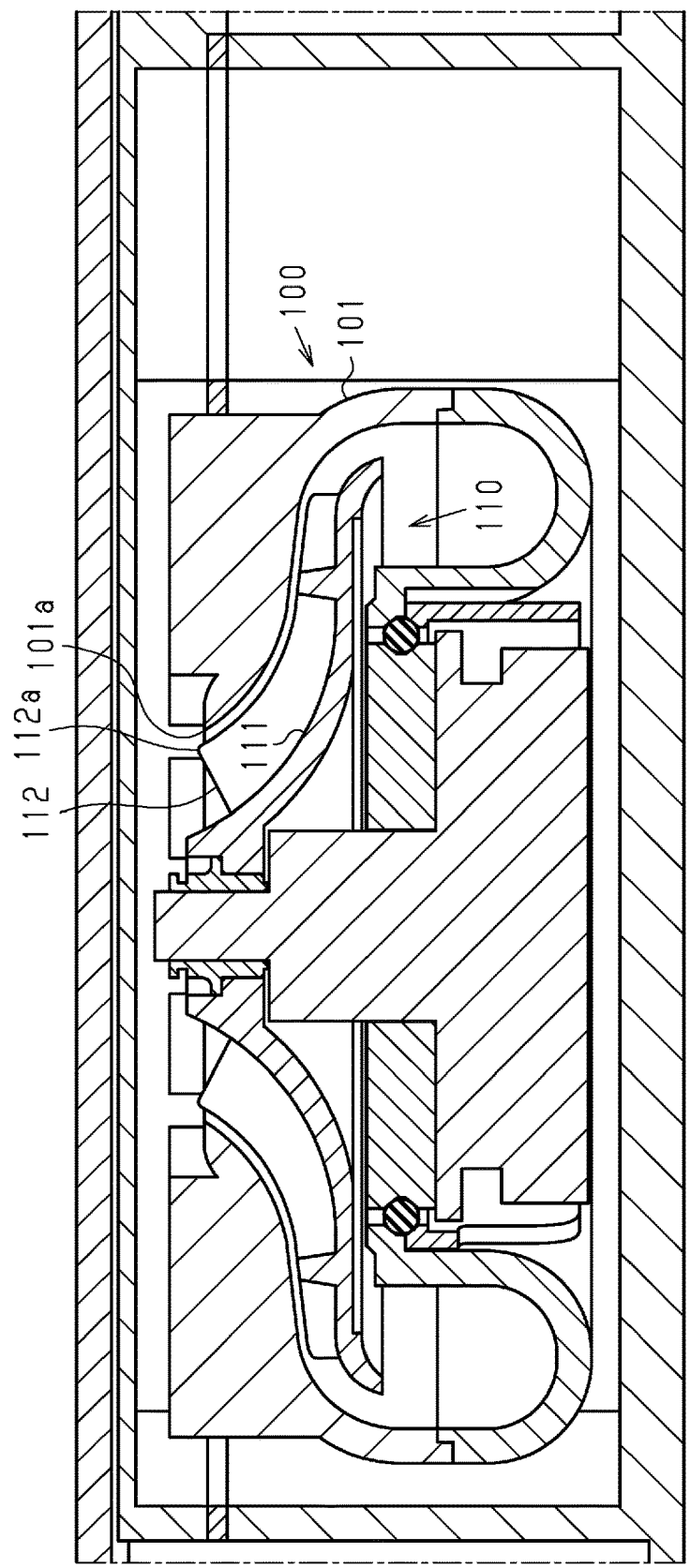
FIG. 11 is a partially enlarged cross-sectional view of a fluid controller in a third comparative example.

A third comparative example of the present embodiment will now be described. FIG. 11 is a partial cross-sectional view of a fluid controller including a fan unit 100 of the third comparative example. In the third comparative example, a fan 110 housed in a fan case 101 includes a holding plate 111 and blades 112 extending from the holding plate 111. Each blade 112 has a vertex 112a located radially inward from an intake port 101a of the fan case 101. The vertex 112a projects out of the fan case 101 from the intake port 101a.

In the third comparative example, when the fan 110 is rotated, a force applied to air by the blades 112 of the rotating fan 110 at the inner side from the intake port 101a of the fan case 101 generates an airflow not only in the downstream direction of the first passage 71 but also in various directions. When an airflow is generated toward, for example, the intake port 40a, the flow of air drawn from the intake port 40a will be disturbed. In this manner, when the flow of air is disturbed, noise may increase.

In contrast, with the fan unit 31 of the present embodiment as shown in FIG. 8, the vertexes 53c of the first blades 53 of the fan 50 accommodated in the fan case 40 are located radially outward from the intake port 40a of the fan case 40 and covered by the fan case 40 (upper case 42). When the fan 50 is rotated, the rotating first blades 53 applies force to air that is directed downstream in the first passage 71. This limits disturbance in the flow of air. Thus, noise is reduced.

Figure 16:
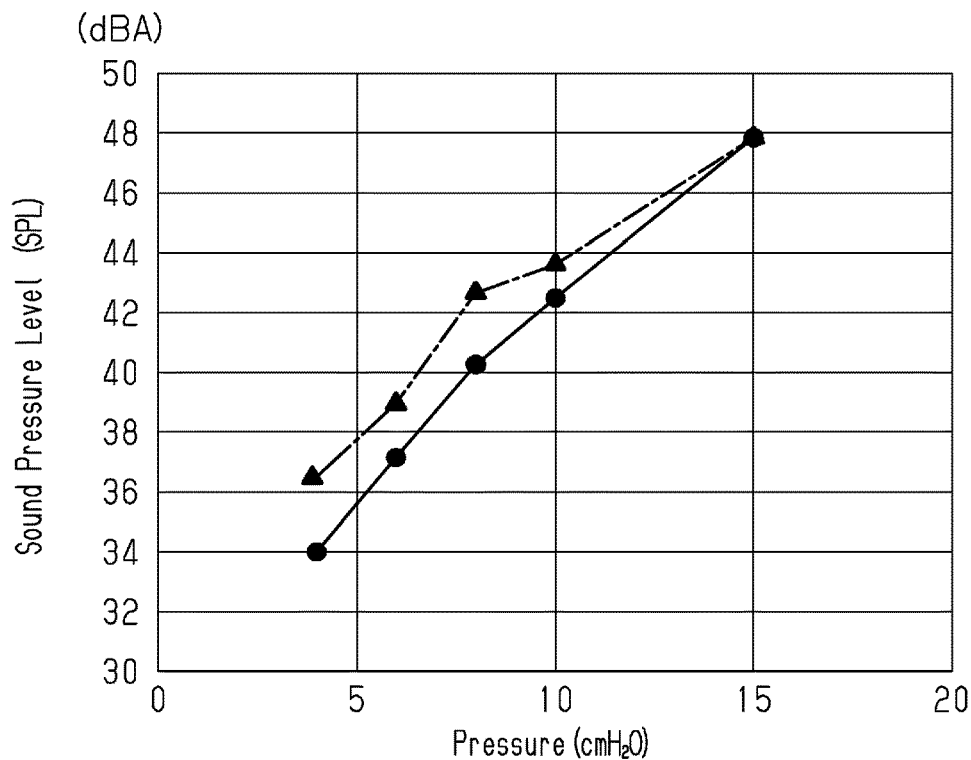
FIG. 16 is a graph showing pressure-sound pressure level characteristics of the first embodiment and the third comparative example.

FIG. 16 shows a sound pressure level (LPM) of the present embodiment and the third comparative example relative to pressure. In FIG. 16, the solid line and black circles show the characteristics of the fan unit 31 of the present embodiment, and the long-dash short-dash line and black triangles show the characteristics of the fan unit 100 of the third comparative example shown in FIG. 11. The fan unit 31 of the present embodiment has a lower sound pressure level than the fan unit 100 of the third comparative example.

Figure 17:
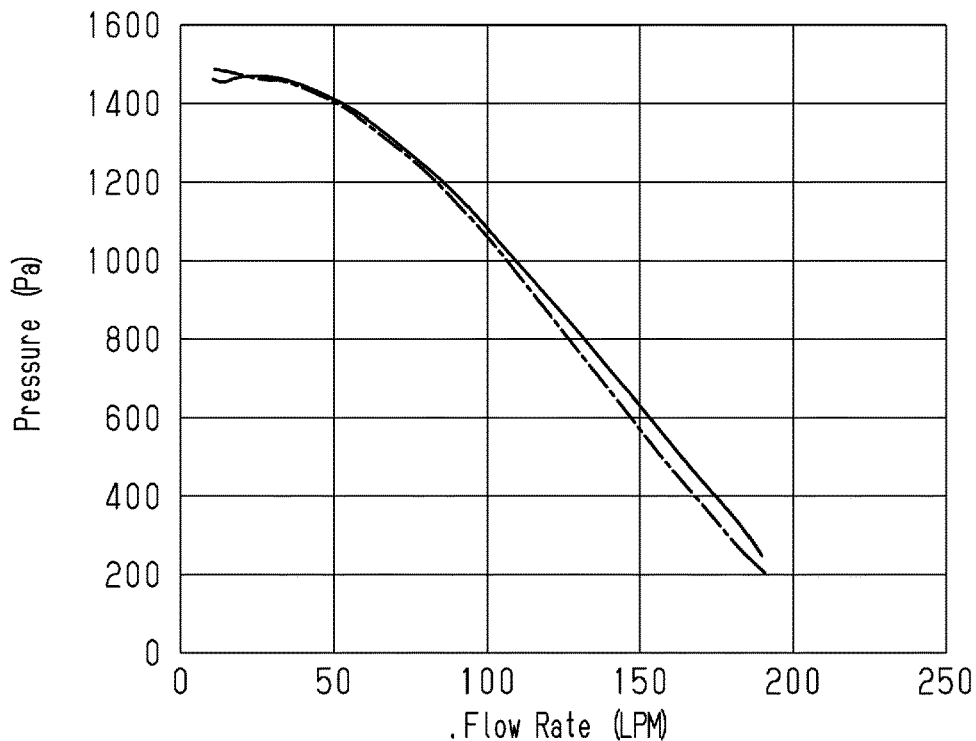
FIG. 17 is a graph showing flow rate-pressure characteristics of the first embodiment and the third comparative example.

FIG. 17 shows flow rate and pressure for the present embodiment and the third comparative example. In FIG. 17, the solid line shows the characteristics of the fan unit 31 of the present embodiment, and the long-dash short-dash line shows the characteristics of the fan unit 100 of the third comparative example shown in FIG. 11. The present embodiment has the same characteristics as the third comparative example. Further, the present embodiment has slightly higher pressure at high flow rates (150 LPM). This is assumed to be caused by the following reason. In the third comparative example shown in FIG. 11, when a flow of air toward the intake port 40a is generated, air drawn from the intake port 40a is disturbed as described above. In contrast, with the fan unit 31 of the present embodiment, the vertexes 53c of the first blades 53 are covered by the fan case 40 so that air is efficiently directed downstream in the first passage 71. This improves the characteristics of the flow rate and the pressure of the fan unit 31.

Figure 18:
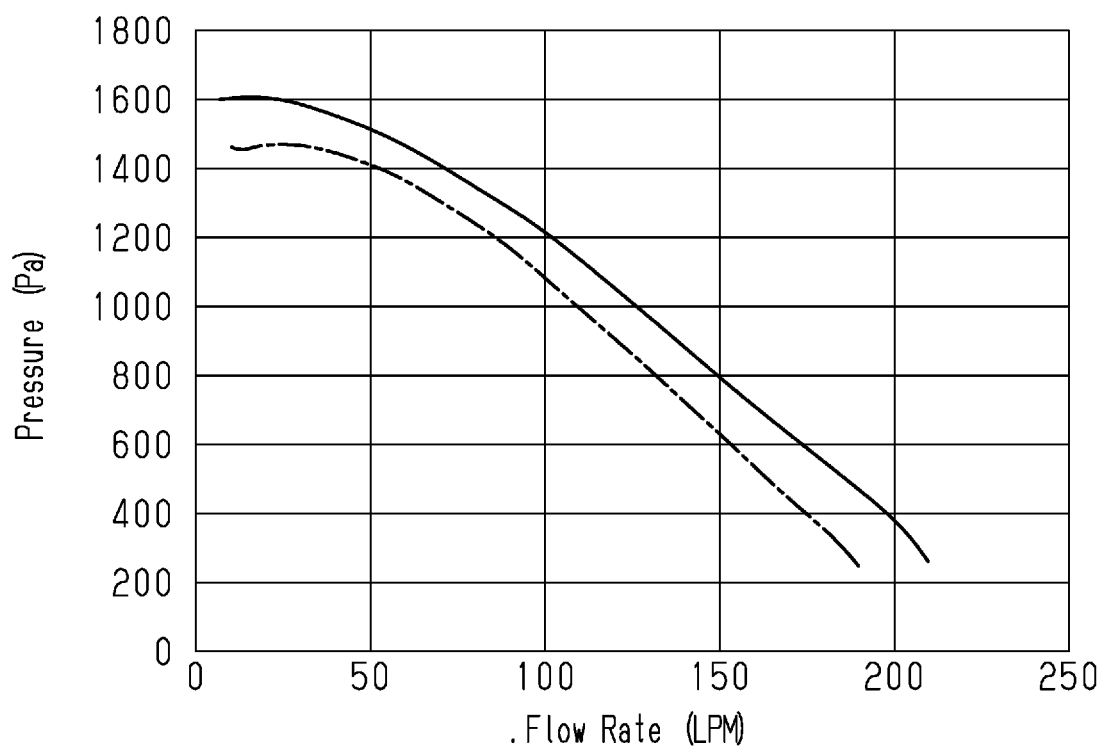
FIG. 18 is a graph showing flow rate-pressure characteristics of the first embodiment and the first comparative example.

FIG. 18 shows pressure relative to the flow rate for the present embodiment and the first comparative example. In FIG. 18, the solid line shows the characteristics of the present embodiment, and the long-dash short-dash line shows the characteristics of the first comparative example. The characteristics of the present embodiment are improved. The flow rate is changed in accordance with the rotation speed of the fan 50. The present embodiment allows the rotation speed of the fan 50 to be decreased when obtaining the same flow rate. A decrease in the rotation speed of the fan 50, that is, a decrease in the rotation speed of the motor body 61 reduces noise. Thus, at the same flow rate, noise is reduced, that is, quietness is improved.

In the fan unit 31 of the present embodiment, the outer circumferential end section 51*d* of the holding plate 51 becomes thinner toward the radially outward distal end. The second surface 51*b* is curved so that the thickness of the holding plate 51 from the first surface 51*a* decreases toward the distal end at the outer circumferential end section 51*d*. The thickness (width in radial direction) of the distal end of the holding plate 51 is preferably less than or equal to 1 mm.

As shown in FIG. 12B, if the holding plate 131 remains thick to the end, a large moment of inertia acts on the holding plate 131. Thus, even a slight eccentricity would apply a great force to the rotary shaft that vibrates the rotary shaft. This will deteriorate durability and increase noise. In the present embodiment, the outer circumferential end section is formed to become thinner toward the radially outward distal end. This reduces the moment of inertia to reduce vibration, limit durability deterioration, and reduce noise and the like.

In the fan unit 130 of the comparative example in FIG. 12B, the end of the holding plate 131 is thick. This generates secondary swirls between airflows shown by arrows Y11 and a rotational flow of the second passage 72 shown by an arrow Y12 that form a complicated flow and produce noise.

In contrast, in the fan unit 31 of the present embodiment, the outer circumferential end section 51*d* of the holding plate 51 is formed to become thinner toward the radially outward distal end. This hinders the generation of secondary swirls between an airflow shown by an arrow Y1 and flowing from the buffer passage 73 to the second passage 72 and a rotational flow of the second passage 72 shown by an arrow Y2. This reduces flow disturbance and noise.

Further, it is preferred that the noise of a secondary swirl has a frequency greater than or equal to a frequency from where the noise becomes subtly audible (e.g., 8 kHz). When a CPAP device is used as shown in FIG. 2, the fan 50 is driven at about 10 cm H$_2$O. In this case, the speed of the outer circumferential end section of the fan 50 is approximately 40 m/s. When the noise frequency of a secondary swirl is greater than or equal to the above range (e.g., 8 kHz), the thickness of the distal end of the holding plate 51 is preferably set to 1 mm or less.

As described above, the present embodiment has the following advantages.

(1) The fan unit 31 includes the fan case 40 and the fan 50. The fan case 40 includes the intake port 40*a* and the discharge port 40*b*. The fan 50 arranged in the fan case 40 includes the holding plate 51, which includes the first surface 51*a* and is rotationally supported, and the blades 52 (first blades 53 to third blades 55), which extend from the first surface 51*a* of the holding plate 51. The fan unit 31 includes the first passage 71 and the second passage 72. The first passage 71 is connected to the intake port 40*a* and encompassed by the inner surface 42*d* of the fan case 40, the first surface 51*a* of the holding plate 51, and two adjacent blades 52. The second passage 72 is connected to the discharge port 40*b* at the side of the second surface 51*b* of the holding plate 51. In the fan unit 31, the outer circumferential end section 51*d* of the holding plate 51 has a flared shape. The first surface 51*a* at the outer circumferential end section 51*d* is a curved surface (rounded surface) that is upwardly bulged to extend downward and radially outward so as to have a steep inclination. This gradually curves the flow thereby reducing pressure changes and limiting the generation of backflows. Thus, air is efficiently discharged.

(2) In the fan unit 31, the outer circumferential end section 51*d* of the holding plate 51 is formed to become thinner toward the radially outward distal end. The second surface 51*b* is curved so that the thickness of the holding plate 51 from the first surface 51*a* decreases toward the distal end at the outer circumferential end section 51*d*. The thickness (width in radial direction) of the distal end of the holding plate 51 is preferably less than or equal to 1 mm. This reduces the moment of inertia to reduce vibration, limit durability deterioration, and reduce noise and the like.

(3) In the fan unit 31, the outer circumferential end section 51*d* of the holding plate 51 is formed to become thinner toward the radially outward distal end. This hinders the generation of secondary swirls between an airflow from the buffer passage 73 to the second passage 72 and a rotational flow of the second passage 72, thereby limiting flow disturbance and reducing noise.

(4) With the fan unit 31, the vertexes 53*c* of the first blades 53 of the fan 50 accommodated in the fan case 40 are located radially outward from the intake port 40*a* of the fan case 40 and covered by the fan case 40 (upper case 42). When the fan 50 is rotated, a force applied to air by the rotating first blades 53 is directed downstream in the first passage 71. Thus, airflow disturbance is limited. This reduces noise.

(5) With the fan unit 31, the vertexes 53*c* of the first blades 53 are covered by the fan case 40 so that air is directed downstream in the first passage 71. This efficiently discharges air.

(6) The distance D1 from the first surface 51*a* of the holding plate 51 to the inner surface 42*d* of the fan case 40 that is opposed to the first surface 51*a* is reduced toward the outer circumferential end section 51*d* of the holding plate 51. The blades 52 (first blades 53 to third blades 55) extend from the central region of the holding plate 51 to the outer end of the holding plate 51 as viewed in the center axis direction of the fan 50. The fan unit 31 does not reduce the flow speed of fluid. This limits the separation of fluid and the generation of swirls, limits flow disturbance, and reduces noise.

(7) In the fan 50, the buffer passage 73 is defined by the region between the surface of the outer circumferential end section 51*d* of the holding plate 51, where the blades 52 (first blades 53 to third blades 55) are not formed, and the inner surface 42*d* of the upper case 42. The first surface 51*a* of the holding plate 51 and the inner surface 42*d* of the upper case 42 are formed so that the cross-sectional area of the buffer passage 73 is substantially constant or gradually reduced from the intake port 40*a* to the second passage 72. This limits disturbance in the flow of fluid and reduces noise without decreasing the flow speed of fluid.

The above embodiment may be modified as follows.

In the above embodiment, the shape of the fan 50 may be modified.

In the above embodiment, the arrangement and structure of the blades 52 (first blades 53 to third blades 55) may be modified.

At least either one of the first blades 53 and the second blades 54 may be successively arranged in the order of, for example, the first blade 53, the second blade 54, the second blade 54, the first blade 53, the second blade 54, and the like.

Further, the first blade 53, the second blade 54, and the third blade 55 may be sequentially arranged in this order in the circumferential direction.

The third blades 55 may be omitted so that the fan includes the first blades 53 and the second blades 54. Alternatively, the second blades 54 may be omitted so that the fan includes the first blades 53 and the third blades 55.

The technical aspects that are understood from the above embodiment will now be described.

Embodiment 1

An air blower including:
a fan case that includes an intake port and a discharge port;
a fan arranged in the fan case, where the fan includes a holding plate that includes a first surface and is rotationally supported and blades that project from the first surface and are arranged in a rotation direction; and
a first passage connected to the intake port and encompassed by an inner surface of the fan case, the first surface of the holding plate, and two adjacent ones of the blades, where
the intake port is circular and extends about a rotary shaft of the fan, and
the blades each include a vertex that is located radially outward from the intake port.

Embodiment 2

The air blower according to embodiment 1, where
the blades extend from a radially inner end of the holding plate toward an outer end of the holding plate as viewed in a direction of a center axis of the fan, and
in each of the blades, one end that is closer to the center axis of the fan is located frontward from another end in the rotation direction of the fan.

Embodiment 3

The air blower according to embodiment 1 or 2, where the blades include blades that have different lengths from one end that is closer to a center axis of the fan to another end.

Embodiment 4

The air blower according to embodiment 3, where
the blades include a first blade and a second blade that is longer in length than the first blade, and
the vertex is a vertex of the first blade.

Embodiment 5

The air blower according to embodiment 4, where one or more of the second blades are arranged between the first blades in a circumferential direction of the holding plate.

Embodiment 6

The air blower according to embodiment 4 or 5, where the blades further include a third blade that is shorter in length than the second blade.

Embodiment 8

A fluid controller including:
the air blower according to any one of embodiments 1 to 7; and
a case that accommodates the air blower, where
the case includes a partitioning portion that accommodates the air blower and an inner case that closes an opening of the partitioning portion,
the air blower is arranged to direct the intake port of the air blower toward the inner case, and
the fan case of the air blower includes guiding walls that extend from an outer circumference of the intake port in a radial direction.

Embodiment 11

An air blower including:
a fan case that includes an intake port and a discharge port;
a fan arranged in the fan case, where the fan includes blades and a holding plate, and the holding plate includes a first surface on which the blades are arranged and a second surface at a side opposite to the first surface;
a first passage connected to the intake port and encompassed by the first surface of the holding plate, an inner surface of the fan case, and two adjacent ones of the blades; and
a second passage connected to the discharge port, where the second passage is arranged in the holding plate at a side of the second surface, where
the holding plate includes an outer circumferential end section located radially outward from the blades, and
the outer circumferential end section is flared so that the outer circumferential end section extends radially outward and downward so as to have a steep inclination.

Embodiment 12

The air blower according to embodiment 11, where the outer circumferential end section is reduced in thickness toward a distal end.

Embodiment 13

The air blower according to embodiment 11 or 12, where the outer circumferential end section has a thickness that is less than or equal to 1 mm.

Embodiment 21

An air blower including:
a fan case that includes an intake port and a discharge port;
a fan arranged in the fan case, where the fan includes a holding plate that includes a first surface and is rotationally supported and blades that project from the first surface and are arranged in a rotation direction; and
a first passage connected to the intake port and encompassed by an inner surface of the fan case, the first surface of the holding plate, and two adjacent ones of the blades, where
the blades extend from a central region of the holding plate toward an outer end of the holding plate as viewed in a direction of a center axis of the fan, and a distance from the first surface of the holding plate to an inner surface of the fan case that is opposed to the first surface is decreased from an outer circumferential edge of the intake port to an outer circumferential edge of the holding plate.

Embodiment 22

The air blower according to embodiment 21, where in each of the blades, one end that is closer to a center axis of the fan is located frontward from another end in the rotation direction of the fan.

Embodiment 23

The air blower according to embodiment 21 or 22, where the blades include blades that have different lengths from one end that is closer to a center axis of the fan to another end.

Embodiment 24

The air blower according to embodiment 23, where the blades include a first blade and a second blade that is shorter in length less than the first blade.

Embodiment 25

The air blower according to embodiment 24, where the blades further include a third blade that is shorter in length less than the second blade.

Embodiment 26

An air blower including:
a fan case that includes an intake port and a discharge port;
a fan arranged in the fan case, where the fan includes a holding plate that includes a first surface and is rotationally supported and blades that project from the first surface and are arranged in a rotation direction; and
a first passage connected to the intake port and encompassed by an inner surface of the fan case, the first surface of the holding plate, and two adjacent ones the blades, where
the blades extend from a central region of the holding plate toward an outer end of the holding plate as viewed in a direction of a center axis of the fan,
a distance from the first surface of the holding plate to an inner surface of the fan case that is opposed to the first surface is such that the distance at an outer circumferential edge of the intake port is greater than the distance at an outer circumferential edge of the holding plate,
the first passage includes a narrowed portion, and
the distance at the narrowed portion is less than the distance at a position adjacent to the narrowed portion.

Embodiment 27

The air blower according to any one of embodiments 21 to 26, where
when a cross-sectional area is an area of an annular circumferential surface formed by a path obtained when rotating a line segment that is orthogonal to the first surface of the holding plate and extends from the first surface to the inner surface of the fan case about a rotary shaft of the fan, the cross-sectional area at the central region of the holding plate is the same or greater than the cross-sectional area at the outer end of the holding plate.

Embodiment 28

The air blower according to any one of embodiments 21 to 26, where
when dividing an area of an annular circumferential surface formed by a path obtained when rotating a line segment that is orthogonal to the first surface at a point on the first surface of the holding plate and extends from the first surface to the inner surface of the fan case about a rotary shaft of the fan by a circumferential length of a circle passing through the point to obtain a value that is a height of the first passage at the point, the height of the first passage at a given radial position on the first surface has concave characteristics from one end to another end.

Embodiment 29

A fluid controller including:
the air blower according to any one of embodiments 21 to 28; and
a controller that controls the air blower.

The invention claimed is:
1. An air blower comprising:
a fan case that includes an intake port at an upper portion of the fan case and a discharge port at a side portion of the fan case;
a fan arranged in the fan case, wherein the fan includes a plurality of blades and a holding plate, and the holding plate includes a first surface on which the plurality of blades are arranged and a second surface at a side opposite to the first surface, wherein the fan has a center axis that defines a radial outward direction of the air blower;
a first passage connected to the intake port and defined by the first surface of the holding plate, an inner surface of the fan case, and two adjacent blades of the plurality of blades; and
a second passage connected to the discharge port in the holding plate and located at a side of the second surface,
wherein the holding plate includes an outer circumferential end section located radially outward from the plurality of blades such that the plurality of blades are not arranged on the outer circumferential end section,
wherein the plurality of blades extend toward the outer circumferential end section, and include radially outward ends that are located at a vicinity of the outer circumferential end section,
wherein the outer circumferential end section includes a radial length that is measured from the radially outward ends of the plurality of blades to a distal end of the holding plate,
wherein the outer circumferential end section is curved across the entire radial length of the outer circumferential end section so that the first surface at the outer circumferential end section is convex,
wherein the first surface of the holding plate includes:
a radially inner slope having an inclination that gradually shallows in the radial outward direction relative to a radially intermediate section, and
a radially outer slope corresponding to the outer circumferential end section, the radially outer slope having an inclination that gradually steepens in the radial outward direction relative to the radially intermediate section, and wherein the radially intermediate section connects the radially inner slope and the radially outer slope, and extends substantially parallel to a plane that is orthogonal to the center axis.

2. The air blower according to claim 1, wherein the outer circumferential end section is reduced in thickness toward the distal end of the holding plate.

3. The air blower according to claim 1, wherein the outer circumferential end section includes a thickness that is less than or equal to 1 mm.

4. The air blower according to claim 2, wherein the outer circumferential end section includes a thickness that is less than or equal to 1 mm.

5. The air blower according to claim 1, wherein the first surface where the plurality of blades are arranged inclinedly extends downward and radially outward toward an outer circumference of the holding plate, and the first surface at the outer circumferential end section where the plurality of blades are not arranged is a curved surface that further inclinedly extends downward and radially outward toward the outer circumference so that the inclination of the curved surface becomes steep.

6. A fluid controller comprising:
the air blower according to claim 1; and
a controller that controls the air blower.

7. The air blower according to claim 1, wherein the holding plate has a fixing portion, and the first surface curves downwardly and radially outwardly from the fixing portion to the outer circumferential end section so that an inclination of the first surface gradually reduces until the first surface extends substantially parallel to a plane that is orthogonal to the center axis of the fan.

8. The air blower according to claim 1, wherein the holding plate has a fixing portion, and the second surface curves downwardly and radially outwardly from the fixing portion so that an inclination of the second surface gradually reduces until the second surface extends substantially parallel to a plane that is orthogonal to the center axis of the fan.

9. The air blower according to claim 1, wherein each blade of the plurality of blades has a proximal end and a distal end that is located farther from the center axis of the fan than the proximal end, the proximal end being located rotationally forward from the distal end in a rotation direction of the fan.

10. The air blower according to claim 1, wherein:
the plurality of blades includes a plurality of first blades and a plurality of second blades, each first blade of the plurality of first blades extends from a first radial position of the first surface to the vicinity of the outer circumferential end section, and each second blade of the plurality of second blades extends from a second radial position of the first surface to the vicinity of the outer circumferential end section, the second radial position being located radially outward from the first radial position.

11. The air blower according to claim 10, wherein:
the plurality of blades further includes a plurality of third blades, and each third blade of the plurality of third blades extends from a third radial position of the first surface to the vicinity of the outer circumferential end section, the third radial position being located radially outward from the second radial position.

12. The air blower according to claim 1, wherein a buffer passage is defined between the first surface of the outer circumferential end section and the inner surface of the fan case to restrict, when the fan generates air flow, disturbance in the air flow on the first surface of the holding plate, thereby reducing the noise of the air flow.

13. The air blower according to claim 1, wherein the outer circumferential end section is curved so that the second surface at the outer circumferential end section is concave and has an inclination that gradually increases in the radial outward direction.

14. The air blower according to claim 13, wherein the outer circumferential end section is flared and tapered so that a distance between the first surface and the second surface at the outer circumferential end section gradually decreases toward a distal end of the outer circumferential end section.

15. The air blower according to claim 1, wherein the first surface of the outer circumferential end section and the inner surface of the fan case together form a buffer passage therebetween, the buffer passage extending radially outward in a curved shape, as viewed in a vertical cross section of the holding plate.

* * * * *